United States Patent [19]

Kéri

[11] Patent Number: 5,062,574
[45] Date of Patent: Nov. 5, 1991

[54] PROCESS FOR THE PREPARATION OF ACTIVE-MASS OF IMPROVED QUALITY FROM ACTIVE-MASS WASTES FORMED DURING THE PRODUCTION OF LEAD ACCUMULATORS

[75] Inventor: József Kéri, Budapest, Hungary

[73] Assignee: Akkumulator-Es Szarazelemgyar, Budapest, Hungary

[21] Appl. No.: 567,067

[22] Filed: Aug. 13, 1990

[30] Foreign Application Priority Data

Aug. 16, 1989 [HU] Hungary .............................. 4206/89

[51] Int. Cl.$^5$ ............................................... B02B 5/02
[52] U.S. Cl. ........................................ 241/22; 241/23
[58] Field of Search ................. 419/9, 33, 31; 241/22, 241/23

[56] References Cited

U.S. PATENT DOCUMENTS

Re. 33,133  12/1989  Kiessling ............................. 429/242
4,092,462   5/1978   Giess et al. ........................... 429/50
4,554,228   11/1985  Kiessling ............................. 429/242
4,760,001   7/1988   Nann et al. .......................... 429/136
4,902,591   2/1990   Clerici et al. ....................... 429/204

Primary Examiner—Stephen J. Lechert, Jr.
Attorney, Agent, or Firm—Keil & Weinkauf

[57] ABSTRACT

The invention relates to a process for the preparation of positive or negative active mass of lead accumulators by using the active mass separated from production-refuse plates and/or the active-mass wastes produced during production.

According to the invention when positive active mass is prepared then positive active mass, while when the negative active-mass is prepared then negative active-mass, previously dried and heat-treated at a temperature of 500° to 600° C. and optionally ground, is fed into a lead-powder producing mill, together with metal lead, in an amount of at most 80% by mass calculated for the mass of the metal lead, and the product thus obtained is led into the plate production.

2 Claims, No Drawings

PROCESS FOR THE PREPARATION OF ACTIVE-MASS OF IMPROVED QUALITY FROM ACTIVE-MASS WASTES FORMED DURING THE PRODUCTION OF LEAD ACCUMULATORS

TECHNICAL FIELD

The invention relates to a process for preparing positive or negative active-mass of lead accumulator plates by using the active mass separated from production refuse plates and/or the active mass of worn, waste plates formed during production.

BACKGROUND ART

The starting material for the production of active-mass is lead powder. Lead powder is prepared from lead, e.g. in a Barton mill usually known in industry, and in the course of milling, depending on the grinding conditions, lead oxide is also formed in different amounts. The powder thus obtained is subjected to sulfuric acid/phosphoric acid treatment depending on whether positive or negative active-mass is aimed to be prepared and additives, e.g. sulfuric acid, barium sulfate are mixed to the product thus obtained. The resulting crude active-mass is spread onto electrodes of grid structure with the aid of a spreading machine. Then further operations are carried out on the mass thus applied onto the plates, e.g. pre-drying and aging. In the course of the said operations tetrabasic lead sulfate, wherein the ratio of lead oxide (PbO) to lead sulfate ($PbSO_4$) is 4:1, is formed in the active-mass.

In the accumulator production it is unavoidable that defective plates are also produced. The need for the re-use of such defective plates and for the use of the active-mass content thereof has arisen for a long time.

There are more solutions in the prior art for solving the above problem. According to the most generally employed metallurgical way the plates dismounted from the defective and used accumulators are melted together with the active-mass and the melting process is optionally repeated. Thus the lead-oxide content of the active mass can be separated from the lead alloy from which the grid is formed. The active mass thus recovered is charged into the mixing machines wherein the active-mass is stirred for repeated use according to U.S. Pat. No. 4,009,833 (lines 25 and 26 of column 2). The efficacy of this process is quite low, its heat-energy demand is high and it can also be objected to from the point of view of health and environment protection.

In the industry the process is also known in which the active-mass content of negative plates is separated from the grid with the aid of water jet and the active mass is recycled into the production. However, this process can be used only in case of negative active mass, i.e. it is not suitable for the re-use of all of the wastes. In addition, the negative plates comprising the active mass thus recovered and the accumulators wherein these plates are built in are of reduced capacity. When the said active mass is used, the quality of spreading is lower than when fresh active mass is used and the spreading of the plates on both side can hardly be solved or cannot be solved.

The greatest disadvantage of this process resides in the treatment of the high amount of waste water, containing lead and lead compounds, both from energy-supply and environment-pollution points of view. Probably owing to these reasons the recycling of waste active mass into active-mass mixing equipments has not been spread in the industry.

When working out the present invention, our aim was to partially or fully eliminate the above-listed drawbacks of the known processes and to provide a process which renders it possible to recycle not only the negative but also the positive active-masses into the production and to utilize the positive and negative active masses of the defective accumulators.

The invention is based on the recognition that if the positive and negative active-mass wastes collected separately and stored under pure conditions are fed into the lead-powder mill, instead of the active-mass mixing equipment, as it was suggested by U.S. Pat. No. 4,009,833, and plates are prepared from the ground material thus obtained, then their properties are better than those of the fresh ones.

SUMMARY OF THE INVENTION

Thus, the invention relates to a process for preparing positive or negative active-mass of lead accumulators by using the active mass separated from production-refuse plates and/or the active-mass wastes formed during production.

According to the invention when positive active mass is prepared then positive active mass, while when negative active mass is prepared then negative active mass, previously dried and heat-treated at a temperature of 500° to 600° C. and optionally ground, is fed into a lead-powder producing mill, together with metal lead, in an amount of at most 80% by weight, calculated for the mass of the metal lead, and the product thus obtained is led into the plate production.

DETAILED DESCRIPTION OF THE INVENTION

The dry active mass waste is preferably heat-treated at a temperature of 500° to 600° C. for 8 to 12, preferably 10, minutes before feeding into the powder mill.

The process of the invention can be more or less modified, and the modifications also fall under the scope of the present invention. Thus e.g. the dried, heat-treated active mass fed into the powder mill can comprise also commonly known additives. So it may comprise e.g. 0.2% by mass to 0.5% by mass of lead phosphate and 5% by mass of tetrabasic lead sulfate (wherein the ratio of PbO to Pb-sulfate is 4:1), calculated for the total weight of the material leaving the powder mill.

When the properties of the accumulators prepared by using the active-mass prepared according to the invention were tested, surprising and non-predictable improvement could be observed. The Ah capacity of the accumulators increased and the amount of the necessary active mass decreased, respectively, by about 10%. This means that the same capacity can be achieved when less active mass is used. Moreover, the resistance against overcharging, the useful life and cold-starting (start) time of the accumulators were also significantly improved.

Further advantages of the process of the invention are as follows:

It solves not only the complete using up of active-mass wastes for accumulator production but even results in a production of active mass of improved quality.

The complete re-use of active-mass wastes formed in the accumulator production and of all kinds of active-mass wastes comprising lead/lead oxide from refuse accumulators can be carried out.

It results in an environment-protective working up of wastes.

The amount of technological waste waters can be reduced to about a tenth of the present one.

The ampere-hour capacity of accumulators prepared by using the active mass produced according to the invention increases, thus the necessary mass of active mass can be reduced and thus material can be saved.

The lead-and lead-oxide content of the active mass can be adjusted within wide concentration ranges.

The operation properties of the accumulators prepared by using the active mass produced according to the invention, e.g. their working life, cold starting, etc. significantly improve.

The invention is further illustrated by the following non-limiting examples.

EXAMPLE 1

Preparation of positive mass

The dry positive active mass collected as waste is granulated and then heat-treated at a temperature of about 600° C. and uniformly fed into a so-called Barton powder mill in about 10 minutes in an amount of 33% weight, calculated for the lead content of the fed substance.

The ground "lead powder" thus obtained is mixed in a mixer with 13% by weight of ion-free distilled water for 5 to 10 minutes. Then 10% by mass of 1.3 kg/dm$^3$ sulfuric acid and, after 5 minute stirring, 2% by mass of phosphoric acid are added. After 1 to 3 minute stirring, the active mass is removed from the mixer and cooled below 40° C., then it is spread into the grids of the electrode plates in the usual manner. The drying and aging of the plates is carried out in a manner known per se. The plates thus obtained are built into accumulators.

EXAMPLE 2

Preparation of negative active-mass

The negative active-mass granules are dried and heat-treated in the same way as described in Example 1, then continuously fed into a Barton mill in an amount of 20% by mass, calculated for the lead fed in. Then 1% by mass of barium sulfate, 0.5% by mass of carbon black, 0.1% by mass of wood flour and 0.3% by mass of ligninsulfonic acid or the sodium salt thereof, calculated for the "lead powder" obtained, are added and the dry components are mixed.

Then in a mixer 13% by mass of ion-free water are added to the material leaving the mill, the components are mixed for 5 to 10 minutes, then 8% by mass of 1.3 kg/dm$^3$ sulfuric acid are added under constant stirring. The mixing is continued for 2 to 5 minutes and after cooling to 40° C., the material is spread onto plates, aged and dried in the usual manner. After drying the plates can be used in accumulators.

EXAMPLE 3

The process of Example 1 is followed except that the granulated positive active mass of old accumulators is used as starting material.

The test results carried out with the accumulators comprising the plates prepared according to the invention are summarized in Tables 1 and 2. The capacity test was carried out according to IEC 95-1 (1988), the resistance against overcharging, the working life and the cold starting tests were carried out according to Hungarian Standard No. 591-1977, IEC (1988) and IEC 95-1 (1988), respectively.

TABLE 1

|  | No. of cell |  |  |  |  |  |  |  |
|---|---|---|---|---|---|---|---|---|
|  | 1 | 2 | 3 | 4 | 5 | 6 | 7 | 8 |
| Charge | − | − | − | − | + | + | + | + |
|  | n$^x$ | n$^x$ | o | o | n$^{xx}$ | n$^{xx}$ | o | o |
| g of active mass/Ah | 6 | 6.3 | 6.6 | 7.7 | 7.8 | 7.8 | 9.7 | 9.7 | n = novel, o = old
$^x$with plates prepared according to Example 2
$^{xx}$with plates prepared according to Example 1 and 3

In the Tables "novel" relates to accumulators comprising the positive and negative plates prepared according to the invention, while "old" relates to accumulators prepared by the conventional technique.

The number unambiguously show the reduction of the necessary amount of active mass.

TABLE 2

|  | No. of cell |  |  |  |
|---|---|---|---|---|
|  | 1 | 2 | 3 | 4 |
|  | n$^x$ | n$^{xx}$ | o | o |
| Capacity, Ah | 107.2 | 104.9 | 97.9 | 96.5 |
| RAOC, minutes |  | 10.97 | 7.87 |  |
| LT, minutes | 9.46 | 9.24 | 3.06 | 5.48 |
| Cold st., minutes |  | 2.62 | 1.67 |  | n = novel; o = old
RAOC = resistance against overcharging, 4th cycle
LT = life test, 2nd cycle
Cold st. = cold starting, 3rd cycle
$^x$with plates prepared according to Examples 1 and 2
$^{xx}$with plates prepared according to Examples 2 and 3

The data of Table 2 unambiguously verify that the capacity, resistance against overcharging, working life and cold starting properties of the accumulators comprising the plates prepared according to the invention are significantly better than those of accumulators prepared by the usual technique.

I claim:

1. A process for the preparation of a positve or negative active mass of lead accumulators by using the active mass separated from production-refuse plates and/or the active-mass wastes formed during production, which process comprises:
   a) drying the active mass waste,
   b) heat-treating the dried active-mass waste at a temperature of 500° to 600° C.,
   c) feeding the heat-treated active-mass waste together with metal lead in an amount of at most 80% by mass, based on the mass of the metal lead, into a lead-powder producing mill, wherein the starting active-mass is positive when positive active-mass is prepared and the starting active-mass waste is negative when negative active-mass is prepared.

2. The process as described in claim 1, in which the heat-treated active-mass waste is ground before feeding it into the lead-powder producing mill.

* * * * *